(No Model.) 2 Sheets—Sheet 1.

C. CARR.
FEED BAG SUPPORT.

No. 355,504. Patented Jan. 4, 1887.

WITNESSES
Wm P Edwards
H. L. Coburn.

INVENTOR
Charles Carr
By his Attorney
D. N. B. Coffin (No Model.) 2 Sheets—Sheet 2.
C. CARR.
FEED BAG SUPPORT.

No. 355,504. Patented Jan. 4, 1887.

WITNESSES
Wm P. Edwards
H. L. Coburn

INVENTOR
Charles Carr
By his Attorney
D. N. B. Coffin

United States Patent Office.

CHARLES CARR, OF BOSTON, MASSACHUSETTS.

FEED-BAG SUPPORT.

SPECIFICATION forming part of Letters Patent No. 355,504, dated January 4, 1887.

Application filed July 15, 1886. Serial No. 208,149. (No model.)

*To all whom it may concern:*

Be it known that I, CHARLES CARR, of Boston, in the county of Suffolk and State of Massachusetts, have invented certain new and useful Improvements in Feed-Bag Supports; and I do hereby declare that the following is a full and exact description thereof, reference being had to the accompanying drawings and to the letters of reference marked thereon.

My improvements relate to a supporting device adapted to hold any ordinary bag, bucket, pail, or other vessel commonly used when horses are fed in the street. It is in the nature of a peculiarly constructed and formed frame made to bear upon the collar, hames, breast-plate, or other breast work of the harness. It has its outer end supported by a chain or other easily-adjustable connections to the upper part of the harness—as, for instance, the upper part of the hames, collar, saddle, &c.

The prevailing fault with this class of devices as hitherto constructed is their want of adaptation to the various bags, baskets, pails, and other vessels in common use for this purpose.

One principal object of my invention is to obviate this most common fault, and to furnish at the same time an article of great convenience, compactness, and universal application as a feed-vessel holder for feeding horses in the street.

The device is conveniently adjustable to the height most convenient and comfortable for the animal to be fed. This, also, is one object of my invention.

The device is at once simple, compact, convenient, durable, and not liable to get out of order.

Figure 1:
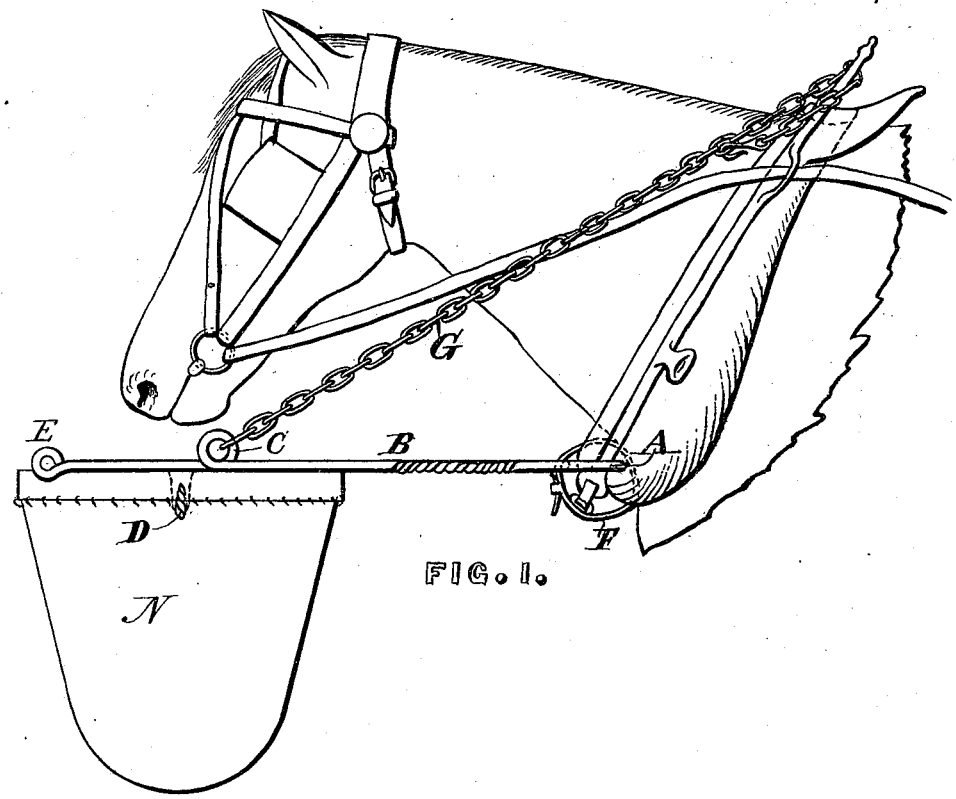
Figure 2:
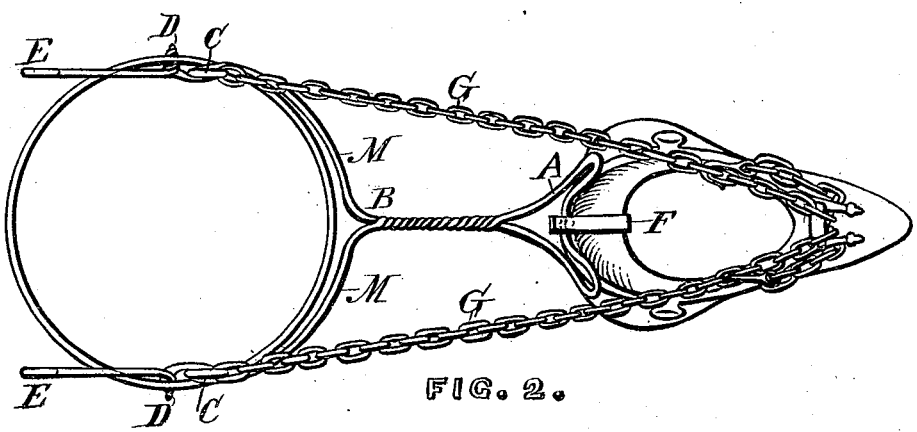
Figure 3:
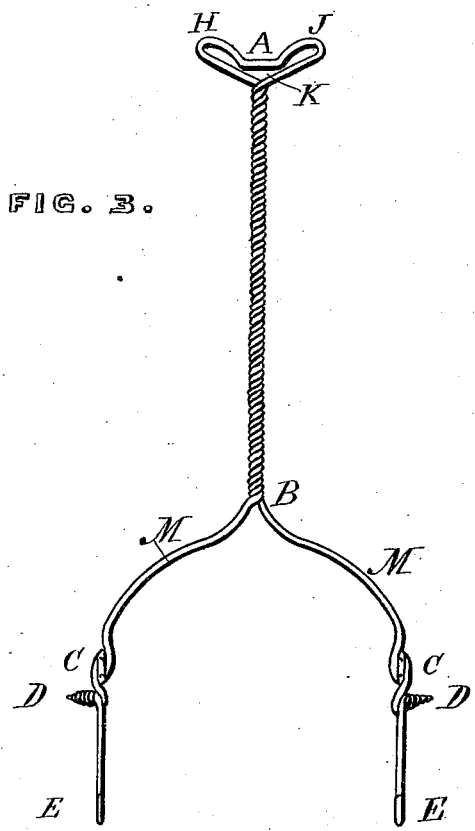
Figure 4:
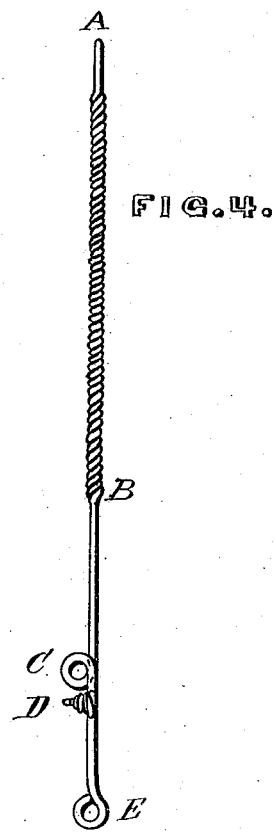
Figure 5:
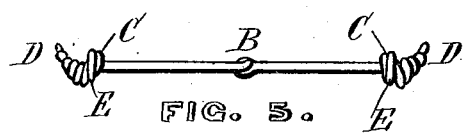

With reference to the drawings, Figure 1 is a side elevation of the device adjusted to the harness upon the horse and to an ordinary feed bag or basket. Fig. 2 is a plan of the same. Fig. 3 is a plan of the frame part, shown alone, without the chains and chain-hooks. Fig. 4 is a side view of the same. Fig. 5 is an end view.

Like letters refer to the same or corresponding parts in all the figures.

The construction is as follows: A wire is bent midway of its length to form a T-shaped foot, A. The parts are then brought together, forming a loop or hole, K, for the strap F, then twisted together to form the arm B, and then separating are bent to form branches or tines M, like the two tines of a fork. Each tine at the proper distance from the point of separation is coiled or bent to form an eye, C, and there or a short distance therefrom the hook D, which is on the outside of the tine M, the extended end E of the tine terminating in a curve, coil, or eye.

The frame thus described can of course be made with the T formed as at H J, the arm or shank B, the strap-eye K, the fork, the eye C, and hooks D, and extended and rounded ends of the tines of malleable cast-iron or other material, and the imitation of twisted wire retained or not. The material, whether wire or not, is not essential, provided the other described features of the construction are preserved. The fork B C D E thus becomes a spring, and may be compressed so as to narrow the width or distance between the two hooks D, so that they may be placed within a pail, basket, box, bag, or other vessel, N, and then, being allowed to move apart again by the recoil of the spring, the hooks are so caused to enter any interstice, hole, loop, or eye, &c., in the vessel; and the hooks, being made somewhat pointed, will make a puncture if none is there, thus securely holding the vessel, the top of which, being brought up close under the fork, is kept from tipping or swinging objectionably upon the hooks. Through the loop or slot K a strap, F, or other suitable fastening is passed for securing the foot A to the harness, and two connections, G, preferably chains with hooks for adjusting, as shown in the drawings, are connected to eyes C, and looped or hooked, or looped and hooked, about some upper part of the harness, preferably the hames. Every link of these chains furnishes a different point of attachment for the hook to take hold, and thereby so many different points of adjustment for the height of the frame and of the vessel supported upon it.

The T-shaped foot A is best illustrated in Fig. 3, where, it will be observed, the bearing parts H J are well spread apart, and the strap-loop K is central and of a suitable width to confine strap F in a central position, so giving steadiness to the supporting device. Thus the vessel is adjusted and held securely at the proper height for the animal to feed comfortably from it; and any kind of a vessel commonly used can thus be adjusted and held by means of my improved support. It has the merit of great simplicity and compactness, and is quite inexpensive.

It will be observed that my device differs materially from all those which require the bag to be distended by a rim above the frame, ring, or fork so to suspend the bag or vessel; also, from those in which the vessel is permanently attached to the horse's head; also, from all those in which the height of the vessel relatively to the horse's head is not readily adjustable; also, from all those in which the frame incloses the bag or vessel; also, from all those having the frame made up of several parts, and from every other known to the me.

I claim—

1. A feed-vessel support consisting of a single wire twisted and bent to form the T-shaped foot A, arm B, and tines M, provided with outside hooks, D, substantially as described.

2. A feed-vessel support consisting of the foot A, provided with loop K, arm B, and tines M, having eyes C and hooks D, substantially as described.

3. A feed-vessel support consisting of the foot A, provided with loop K, arm B, tines M, having eyes C, hooks D, and extended ends E, substantially as described.

4. The combination of the feed-vessel support consisting of the foot A, arm B, and tines M, having eyes C, hooks D, and extended ends E, with the vessel N and adjusting-chains G, substantially as described.

CHARLES CARR.

Witnesses:
ALEX. BEAL,
D. N. B. COFFIN.